(12) United States Patent
Hattori et al.

(10) Patent No.: US 10,675,787 B2
(45) Date of Patent: Jun. 9, 2020

(54) METHOD OF MANUFACTURING COMPOSITE MOLDED BODY

(71) Applicant: Toray Industries, Inc., Tokyo (JP)

(72) Inventors: Kimihiko Hattori, Nagoya (JP);
Masato Sugamori, Nagoya (JP);
Kazuyoshi Nakano, Tokyo (JP);
Yoshito Kuroda, Nagoya (JP); Hideo Matsuoka, Nagoya (JP); Tomoyuki Onodera, Nagoya (JP); Yoshiyuki Honda, Nagoya (JP); Nobuhiko Shimizu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 79 days.

(21) Appl. No.: 16/066,997

(22) PCT Filed: Dec. 14, 2016

(86) PCT No.: PCT/JP2016/087147
§ 371 (c)(1),
(2) Date: Jun. 28, 2018

(87) PCT Pub. No.: WO2017/115650
PCT Pub. Date: Jul. 6, 2017

(65) Prior Publication Data
US 2019/0030760 A1    Jan. 31, 2019

(30) Foreign Application Priority Data

Dec. 28, 2015  (JP) ................................. 2015-256181
Dec. 28, 2015  (JP) ................................. 2015-256765

(51) Int. Cl.
*B29C 33/12* (2006.01)
*B29C 33/34* (2006.01)
(Continued)

(52) U.S. Cl.
CPC .............. *B29C 33/12* (2013.01); *B29C 33/34* (2013.01); *B29C 45/14* (2013.01);
(Continued)

(58) Field of Classification Search
CPC .............. B29C 33/12; B29C 45/14008; B29C 45/14065
See application file for complete search history.

(56) References Cited

U.S. PATENT DOCUMENTS

2014/0339732 A1   11/2014   Asanuma

FOREIGN PATENT DOCUMENTS

JP         5-185466 A      7/1993
JP       2011-143559 A     7/2011
(Continued)

*Primary Examiner* — James Sanders
(74) *Attorney, Agent, or Firm* — DLA Piper LLP (US)

(57) ABSTRACT

A method of manufacturing a composite molded body includes a first step of introducing an FRP base material into a mold via a slit part provided in the mold, and inserting the FRP base material along a mold cavity; and a second step of injecting a molten thermoplastic resin composition A into the mold cavity to form the FRP base material into a three-dimensional shape and integrate the injected thermoplastic resin composition A and the FRP base material. The method makes it possible to easily and accurately mold a composite molded body of which a desired portion is efficiently and accurately reinforced in the same mold.

12 Claims, 5 Drawing Sheets

(51) Int. Cl.
  *B29C 45/14* (2006.01)
  *B29C 70/54* (2006.01)
  *B29C 70/48* (2006.01)
  *B29K 105/08* (2006.01)

(52) U.S. Cl.
  CPC .... *B29C 45/14008* (2013.01); *B29C 45/1418* (2013.01); *B29C 45/14262* (2013.01); *B29C 45/14786* (2013.01); *B29C 70/48* (2013.01); *B29C 70/541* (2013.01); *B29C 45/14065* (2013.01); *B29C 2045/14147* (2013.01); *B29K 2105/0872* (2013.01)

(56) References Cited

FOREIGN PATENT DOCUMENTS

| | | |
|---|---|---|
| JP | 2012-153069 A | 8/2012 |
| JP | 2013-95093 A | 5/2013 |
| JP | 2013-252644 A | 12/2013 |
| JP | 2014-240185 A | 12/2014 |

METHOD OF MANUFACTURING COMPOSITE MOLDED BODY

TECHNICAL FIELD

This disclosure relates to a method of manufacturing a composite molded body and, specifically, to a method of manufacturing a composite molded body by forming a tape-like fiber reinforced plastic (FRP) base material into a three-dimensional shape and integrating it with a thermoplastic resin in a mold.

BACKGROUND

Various manufacturing methods of a composite molded body integrating an FRP base material and another molded body, in particular, another thermoplastic resin molded body, are known. For example, JP 2012-153069 A discloses a method of temporarily forming a carbon fiber reinforced resin (CFRP) sheet-like base material outside a mold, inserting it into the mold to form by high-speed heating and cooling, inserting the formed body into a mold and injecting a resin into the mold to obtain a composite molded body. In that method, however, since at least the temporary forming is performed outside a mold, it is not a process capable of compositing in a same mold, and the molding process becomes complicated.

Further, JP 2013-252644 A discloses a method of fixing a CFRP base material in an injection mold and compositing by injecting a resin. However, there is only a description of a simple layered composite molded body and, in particular, a method of forming a CFRP base material having a three-dimensional shape is not mentioned.

Further, JP HEI 5-185466 A discloses a manufacturing method of a composite molded body in which a CFRP is stamping molded in a mold, the mold is backed to form a space, and a resin is injected into the same mold. However, although that method is suitable for molding a random fiber base material in which reinforcing fibers are randomly arranged, preheating for stamping molding is necessary and, for example, in molding a continuous fiber base material, a problem occurs in which the fibers are broken or their orientation is disturbed, and when a plurality of base materials are to be laminated, or a base material is to be laminated at a predetermined position, a CFRP flows together with a resin at the time of injection and, therefore, there is a problem that it is difficult to laminate the CFRP accurately at a desired position of a molded article.

Furthermore, JP 2011-143559 A discloses a method of manufacturing a composite molded body by thermally welding an injection molded article and a CFRP base material in a molding machine. In that method, however, since the CFRP base material is laminated by laser welding, press molding or the like after manufacturing the injection molded article, especially it is difficult to laminate the CFRP base material to a three-dimensional shape portion of the injection molded article.

It could accordingly be helpful to provide a method capable of manufacturing a composite molded body having a targeted three-dimensional shape portion efficiently by, in particular, in a same mold, forming a tape-like FRP base material into a three-dimensional shape and integrating it with a thermoplastic resin with a high joining strength and a high accuracy.

Further, it could be helpful to provide a manufacturing method of a composite molded body partially added with special measures to a thermoplastic resin joined and integrated as described above to enable maintaining a desired integrated shape or integrated formation during or after the molding.

SUMMARY

We thus provide:

A method of manufacturing a composite molded body by forming a tape-like FRP base material into a three-dimensional shape and integrating the FRP base material with a thermoplastic resin composition A in a mold for injection molding, comprises the steps of:

(1) a first step of introducing the FRP base material into the mold via a slit part provided in the mold, and inserting the FRP base material along a mold cavity; and (2) a second step of injecting a molten thermoplastic resin composition A into the mold cavity to form the FRP base material into a three-dimensional shape and integrate the injected thermoplastic resin composition A and the FRP base material (first method).

Further, a more preferable method of manufacturing a composite molded body by forming a tape-like FRP base material into a three-dimensional shape and integrating the FRP base material with a thermoplastic resin composition A in a mold for injection molding, comprises the steps of:

(1) a first step of introducing the FRP base material into the mold via a slit part provided in the mold, and inserting the FRP base material along a mold cavity;

(2) a step 1a of moving a slide core to store the FRP base material in the cavity; and (3) a second step of injecting a molten thermoplastic resin composition A into the mold cavity to form the FRP base material into a three-dimensional shape and integrate the injected thermoplastic resin composition A and the FRP base material (second method). Namely, it is a method in which the step 1a is added between the first step and the second step of the above-described first method.

In such a method of manufacturing a composite molded body, in the first step, the tape-like FRP base material is introduced from the slit part into the mold, and is inserted into the mold cavity along the mold cavity, that is, along the extended shape of the mold cavity. In this state, the FRP base material is in a state in which its majority is being inserted in the mold cavity, but the end portion of the FRP base material is in a state close to free. Then, in the above-described second method, the FRP base material inserted into the mold is completely stored and held in the cavity by moving the slide core in the step 1a. In the first and second methods, in the second step, the molten thermoplastic resin composition A is injected into the mold cavity and integrated with the FRP base material inserted in the cavity, and a targeted composite molded body is molded. Particularly in the second step, since the FRP base material held in the cavity is pressed to the inner surface of the cavity by the injection pressure of the resin composition A, if the cavity is formed into a predetermined three-dimensional shape, the three-dimensionally shaped portion of the FRP base material, ultimately, of the composite molded body molded by integration with the FRP base material, is formed and molded into a desired shape at an extremely high accuracy. In particular, the forming to a three-dimensional shape in the mold of the FRP base material by the injection resin pressure of the molten thermoplastic resin composition A is possible to be achieved shorter in time than in an ordinary three-dimensional forming method using a press machine or the like. In addition, since these series of steps are carried out in the same mold, also from this point of view, further improvement of molding accuracy, and simplification and facilitation of molding become possible. Furthermore, it is also possible to automate the series of steps.

In the method of manufacturing a composite molded body according to the above-described second method, as a preferred example, in step 1a, before storing the FRP base material in the cavity, the slide core having a function of cutting the FRP base material, attached to the mold, is moved to cut the FRP base material. In this case, even when using a roll-shaped FRP base material wound with a tape, because it is possible to obtain a composite molded body without cutting it at a predetermined length beforehand, it becomes possible to further simplify the molding process as a whole as well as automate it.

Further, in the method of manufacturing a composite molded body, as a preferred example, an additional molded portion, which is partially different in molded shape from a surrounding portion, is formed in a portion molded by the thermoplastic resin composition A. When molding is thus carried out to form an additional molded portion, which is partially different in molded shape from a surrounding portion, it becomes possible to avoid occurrence of troubles during molding or after molding by the additional molded portion, for example, it becomes possible to avoid occurrence of troubles such as warping of the molded body or peeling of a part molded by the FRP base material or the thermoplastic resin composition A originating from a difference in linear expansion coefficient between the FRP base material and the thermoplastic resin composition A, and it becomes possible to maintain targeted integrated shape and integrated formation, and it becomes possible to more reliably and easily obtain a desired composite molded body having targeted shape and formation. Furthermore, when the composite molded body is made as a primary molded article, the primary molded article is inserted into another cavity, and a secondary molded article is manufactured by a method such as one of injecting a molten thermoplastic resin composition B to the cavity, a gap between the cavity and the primary molded article is lost, and it becomes possible to suppress inflow of the molten thermoplastic resin composition B into the gap.

As the above-described additional molded portion formed in the molded part by the thermoplastic resin composition A, for example, those forming a convex portion, a boss, a rib, a hinge, a flange, a claw, a side wall of the molded body and the like can be exemplified, and these may be formed solely, or may be formed by combining a plurality of them. For example, if an additional molded portion such as a convex portion, a boss or a rib is formed, it is possible to partially reinforce the part molded by the thermoplastic resin composition A, that can contribute to avoiding warpage and peeling of the composite molded body, and if an additional molded portion such as a hinge, a flange, a claw or a side wall of the molded body is formed, a special part can be imparted to the molded part of the thermoplastic resin composition A to satisfy a partially required function. From the viewpoint that the suppression effect of resin inflow into the gap at the time of manufacturing the secondary molded article is great, a rib and a side wall of the molded body are preferred.

Further, in the method of manufacturing a composite molded body, as a preferred example, the above-described tape-like FRP base material contains continuous reinforcing fibers, and by containing continuous reinforcing fibers, it becomes possible that the FRP base material itself has excellent mechanical properties and such an FRP base material makes it possible to improve the reinforcement effect of the composite molded body.

In particular, it is preferred that the tape-like FRP base material comprises a unidirectional base material in which continuous reinforcing fibers are arranged in one direction. Since such a unidirectional base material can exhibit particularly high mechanical properties with respect to a specific direction in which continuous reinforcing fibers are arranged, by a condition where the tape-like FRP base material is integrated at a high accuracy at a targeted predetermined position, the composite molded body as a whole can efficiently exhibit high mechanical properties with respect to a desired specific direction. Moreover, since the FRP base material for reinforcement has a tape-like shape, it is possible to efficiently perform predetermined reinforcement on the composite molded body to be molded, focusing on a portion where reinforcement is required. The thermoplastic resin composition A injected in the second step may be a resin composition containing discontinuous reinforcing fibers as needed. In a thermoplastic resin composition containing discontinuous reinforcing fibers, since the portion formed by the molten thermoplastic resin composition A to be injected and filled is also formed as a fiber reinforced resin portion, the entire composite molded body can be made of a fiber reinforced resin, and it becomes possible to improve the mechanical properties of the composite molded body as a whole.

Further, in the method of manufacturing a composite molded body, as the kind of reinforcing fibers used for the tape-like FRP base material, although any of carbon fibers, glass fibers, aramid fibers, other reinforcing fibers, and a combination of these reinforcing fibers can be employed, to improve the mechanical properties of a specific portion of the finally formed composite molded body most efficiently, it is preferred to contain carbon fibers as reinforcing fibers.

It is preferred that the thermoplastic resin composition A comprises at least one resin selected from a polyamide-based resin, a polyarylene sulfide-based resin and a polyolefin-based resin.

Furthermore, in the method of manufacturing a composite molded body, a mold cavity having a slide mechanism can be used when manufacturing a composite molded body formed into a three-dimensional shape as described above. In that case, in the same mold, by sliding the above-described cavity to a newly set second cavity together with the composite molded body, placing the composite molded body in the second cavity, and injecting a molten thermoplastic resin composition A into and filling it in the second cavity to integrate, a composite molded body as a secondary molded article can be manufactured. Since the composite molded body as a primary molded article is molded into a composite molded body reinforced at a desired part efficiently and accurately by the tape-like FRP base material as described above, and besides, manufacturing of a secondary molded article using the same can be carried out in the same mold with a slide mechanism, the entire molding process can be simplified and automation also becomes possible.

Still further, in the method of manufacturing a composite molded body, by making a composite molded body formed into a three-dimensional shape as aforementioned as a primary molded article, inserting the composite molded body as a primary molded article into a cavity of another mold, and injecting a molten thermoplastic resin composition B into the cavity, a composite molded body as a secondary molded article can also be manufactured. Since the composite molded body as a primary molded article is molded into a composite molded body reinforced at a desired part efficiently and accurately by the tape-like FRP base material as aforementioned, the composite molded body insert molded using the same as a secondary molded article can also be molded into a composite molded body reinforced efficiently and accurately with a desired part.

In the method of manufacturing a composite molded body, it is preferred that the mold temperature during molding of the thermoplastic resin composition A is 100 to 200° C., that is, it is within a relatively low temperature range, though depending upon the kind of the thermoplastic resin composition A. By the condition where the mold temperature is within this range, the tape-like FRP base material is more easily formed into a three-dimensional shape, and breakage of the fibers at the time of forming is suppressed. The temperature is more preferably 120° C. or higher, further preferably 140° C. or higher.

Any of the thermoplastic resin composition A and the thermoplastic resin composition B to be injected may be a resin composition containing discontinuous reinforcing fibers as required. If it is a thermoplastic resin composition containing discontinuous reinforcing fibers, since the part formed by the molten thermoplastic resin composition to be injected and filled is also constituted as a fiber reinforced resin part, apart from the degree of reinforcement by that part, the entire composite molded body can be made of fiber reinforced resin, and it becomes possible to improve the mechanical properties of the composite molded body as a whole.

As described above, according to the method of manufacturing a composite molded body, it becomes possible to easily and accurately mold a composite molded body in which desired portions are efficiently and accurately reinforced in the same mold. Further, it becomes also possible to easily and accurately mold a composite molded body as a secondary molded article using the composite molded body molded as described above. Furthermore, if an additional molded portion is formed in the portion molded by the thermoplastic resin composition A as required, it is possible to effectively prevent occurrence of troubles such as warping or peeling during molding or after molding, and to manufacture a desired composite molded body more reliably and easily.

BRIEF DESCRIPTION OF THE DRAWINGS

FIG. 4(A) is a schematic plan view of a tape-like FRP base material, FIG. 4(B) is a schematic plan view of a composite molded body to be molded which is developed in plane, FIG. 4(C) is a schematic side view of FIG. 4(B), and FIG. 4(D) is a schematic perspective view of a composite molded body having an actually molded three-dimensional shape portion.

FIG. 7(A) and FIG. 7(B) are schematic side views of composite molded bodies, and FIG. 7(C) is a schematic side view and a partial schematic plan view.

EXPLANATION OF SYMBOLS

Figure 1:
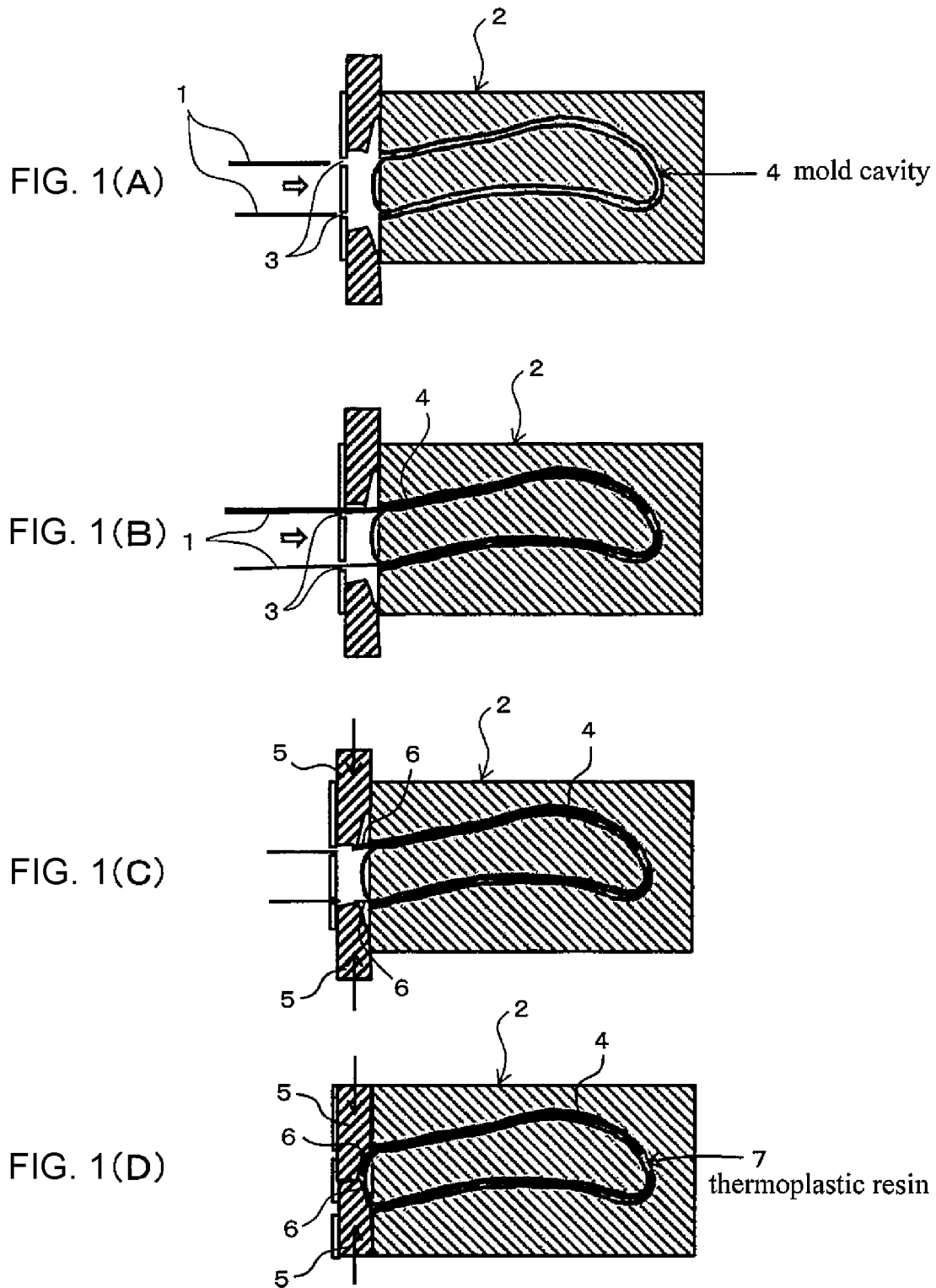
FIGS. 1(A)-1(D) are schematic sectional views showing a method of manufacturing a composite molded body according to a first example.

1: tape-like FRP base material
2: mold
3: slit part
4: mold cavity
5: slide core
6: cut end portion of FRP base material
7: thermoplastic resin (composition)
11, 11a, 11b: composite molded body
12; thermoplastic resin molded part
13: secondary molded article
21: tape-like FRP base material
21a: FRP base material formed into three-dimensional shape
22: molded portion by thermoplastic resin composition A
23: portion molded into a shape along FRP base material
24: ribs as additional molded portion
25: composite molded body
31, 41, 51, 61, 71: composite molded body
32, 42: tape-like FRP base material formed into three-dimensional shape
33, 43, 52: molded portion by thermoplastic resin composition A
34: rib as additional molded portion
44: boss as additional molded portion
53: convex portion as additional molded portion
62: flange as additional molded portion
63: claw as additional molded portion
72: boss as additional molded portion
73: rib as additional molded portion
74: hinge as additional molded portion
75: side wall as additional molded portion

DETAILED DESCRIPTION

Hereinafter, examples of our methods will be explained referring to drawings.

In a first example of a method of manufacturing a composite molded body, (1) a first step of introducing a tape-like FRP base material into a mold via a slit part provided in the mold, and inserting the introduced FRP base material along a mold cavity; and (2) a second step of injecting a molten thermoplastic resin composition A into the mold cavity to form the FRP base material into a three-dimensional shape and integrate the injected thermoplastic resin composition A and the FRP base material, are provided, and in a second example, (1) a first step of introducing a tape-like FRP base material into a mold via a slit part provided in the mold, and inserting the FRP base material along a mold cavity; (2) a step 1a of moving a slide core to store the FRP base material in the cavity; and (3) a second step of injecting a molten thermoplastic resin composition A into the mold cavity to form the FRP base material into a three-dimensional shape and integrate the injected thermoplastic resin composition A and the FRP base material, are provided, and these series of steps are carried out in the same mold.

In the above-described first step, for example, as shown in FIG. 1(A), a tape-like FRP base material 1, for example, a tape-like FRP base material 1 comprising a unidirectional base material arranged with reinforcing fibers in one direction along the longitudinal direction (in the illustrated example, two tape-like FRP base materials 1) is introduced from a slit part 3 (two slit parts 3 in the illustrated example) provided in a mold 2 toward the interior of the mold 2 in the direction of the arrow, and as shown in FIG. 1(B), the FRP base material 1 introduced from the slit part 3 is advanced so that the tip side portion thereof is inserted into a mold cavity 4 along the mold cavity 4 and is inserted by a predetermined length, in the illustrated example, up to the depth of the mold cavity 4. The slit part 3 is formed, for example, as a gap engraved in the mold 2 in a state where the mold 2 is closed.

In the state where a predetermined length of FRP base material 1 is inserted in the mold cavity 4, the FRP base material 1 being fed may still be in a state where the portion inside the mold 2 and the portion outside the mold 2 are connected. In this case, after the feeding operation of the FRP base material 1 is stopped in the step 1a in the second method, for example, as shown in FIG. 1(C), a slide core 5 having a function of cutting the FRP base material 1 which is attached to the mold 2, in the illustrated example, the slide cores 5 provided at the upper and lower positions in the figure, respectively, are moved in the directions of the arrows in the figure, and the FRP base materials 1 are cut.

Although end portions 6 of the above-described cut FRP base materials 1 on the mold 2 side are substantially in a free state at the cut state, successively, for example, as shown in FIG. 1(D), the slide cores 5 are further moved in the same directions, and the cut FRP base materials 1, in particular the cut end portions 6 thereof, are stored in the cavity 4. On the inner surface side of the slide core 5, for example, an adequate curved surface is formed, and the cut end portion 6 of the FRP base material 1 is smoothly stored in a predetermined position in the cavity 4 via the curved surface.

After the FRP base material 1 is stored in the cavity 4, in the second step, for example, as shown in FIG. 1(D), a molten thermoplastic resin composition A (7) is injected into the cavity 4 of the closed mold 2, and utilizing the molten resin injection pressure, the FRP base material 1 stored in the cavity 4 is pressed onto the inner surface of the cavity 4, and formed into a three-dimensional shape that follows the inner surface shape of the cavity 4, and the injected thermoplastic resin composition A (7) and the formed FRP base material 1 are firmly integrated, thereby obtaining a targeted composite molded body.

Figure 2:
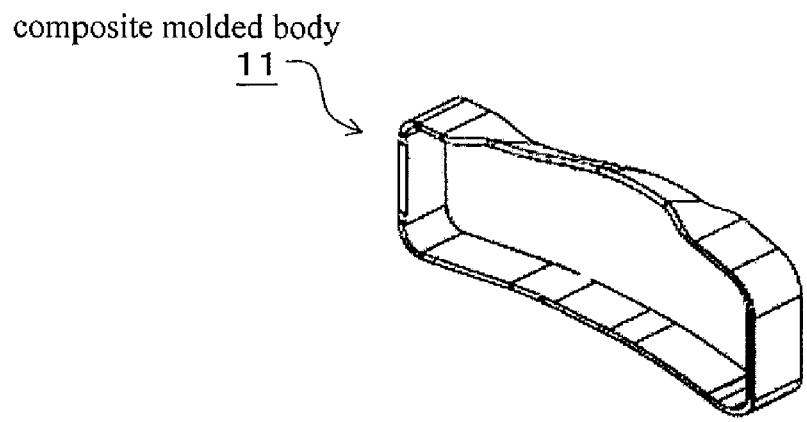
FIG. 2 is a perspective view showing an example of a composite molded body as a primary molded article.

The composite molded body thus molded becomes, for example, a composite molded body 11 having a three-dimensional shape as shown in FIG. 2. Since the FRP base material 1 is contained and integrated at a predetermined three-dimensional shape in such a composite molded body 11, by the FRP base material 1, the composite molded body 11, in which the targeted part is reinforced efficiently and accurately, can be obtained.

Figure 3:
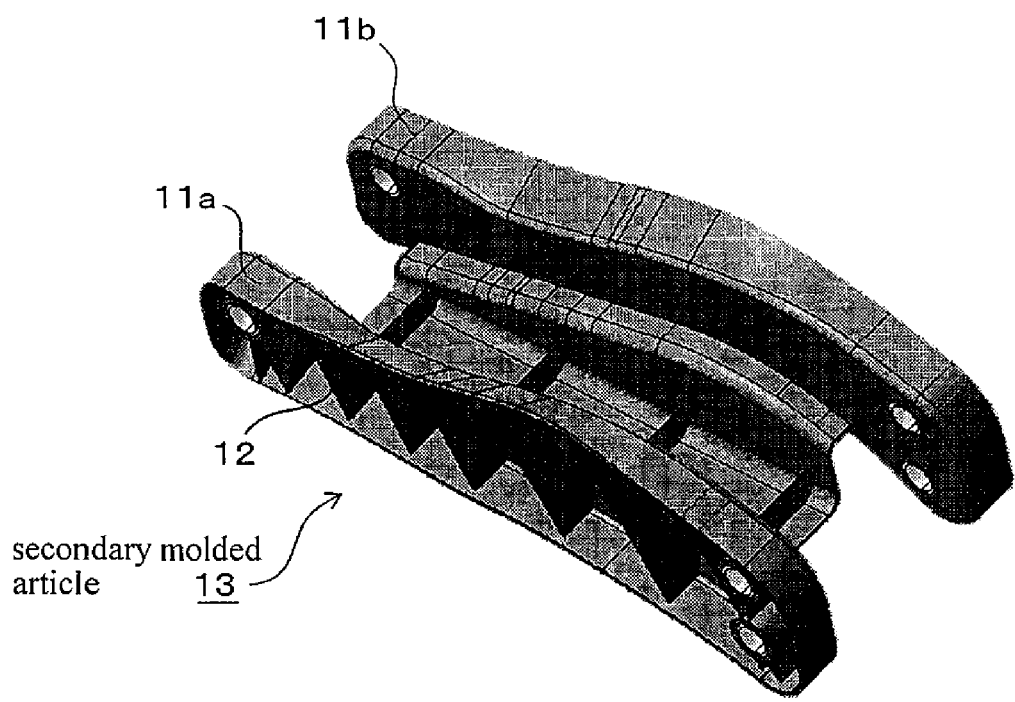
FIG. 3 is a perspective view showing an example of a composite molded body as a secondary molded article.

Further, a composite molded body as a secondary molded article can also be manufactured by inserting the composite molded body 11 formed into the three-dimensional shape as described above into the cavity of another mold, and injecting a molten thermoplastic resin (it may be the same resin as the thermoplastic resin 7 or may be a different resin) into the cavity. For example, as shown in FIG. 3, a secondary molded article 13 can be manufactured by arranging the composite molded body 11 as described above symmetrically in the cavity of another mold, and injecting a molten thermoplastic resin (thermoplastic resin composition B) into the cavity relatively to the arranged composite molded bodies 11a and 11b to integrate the thermoplastic resin molded part 12 and the composite molded bodies 11a and 11b. In this secondary molded article 13, since the FRP base material 1 is integrated at a high accuracy with the composite molded body 11 as the primary molded article, even after molding the secondary molded article 13, the reinforcing FRP base material 1 for reinforcement is integrated at a high accuracy with the targeted part, and the secondary molded article 13 in which the targeted part is reinforced accurately can be obtained.

Further, it is also possible to mold the secondary molded article by the same mold used to mold the composite molded body 11 as the primary molded article, in particular, a mold provided with a slide mechanism. For example, after forming the composite molded body 11 having the three-dimensional shape as described above, a second cavity is newly set using the slide mechanism, and the original mold cavity is slid to the second cavity together with the composite molded body 11, and placed in the second cavity, and the molten thermoplastic resin composition A (7) is injected and filled in the second cavity and it is integrated to manufacture a composite molded body as a secondary molded article. In this case, since the same mold for injection is used, the thermoplastic resin composition injected in the secondary molding becomes the same thermoplastic resin composition A (7) used for the primary molding.

In a method of manufacturing a composite molded body in which a tape-like FRP base material is inserted into a cavity of a mold for injection molding, and by injecting a molten thermoplastic resin composition A, the FRP base material is formed into a three-dimensional shape and integrated with the thermoplastic resin composition A, an example can be employed wherein an additional molded portion, which is partially different in molded shape from a surrounding portion, is formed in a portion molded by the thermoplastic resin composition A. Although as the additional molded portion, a convex portion, a boss, a rib, a hinge, a flange, a claw, a side wall of the molded body and the like can be exemplified as aforementioned, the case of forming ribs will be explained with reference to FIGS. 4(A)-4(D).

Figure 4A:
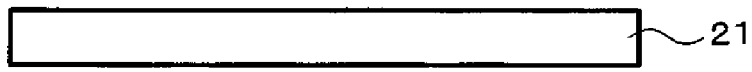
FIGS. 4(A)-4(D) show a method of manufacturing a composite molded body according to a second example.
Figure 4B:
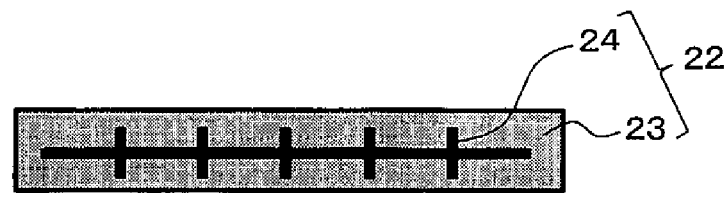
Figure 4C:

For example, a tape-like FRP base material 21 as shown in FIG. 4(A) (for example, nylon 6 carbon fiber continuous fibers having a width of 20 mm, a thickness of 0.3 mm, and a continuous fiber content of 50% by weight), in an injection molding machine set at a cylinder temperature of 270° C. and at a mold temperature of 150° C., is formed into a three-dimensional shape and integrated with a thermoplastic resin A by being pressed onto the inner surface of the mold cavity by the resin pressure of the molten thermoplastic resin composition A injected into the mold for injection molding, for example, glass fiber 40% reinforced polyamide 6, and a rib as an additional molded portion is formed in the portion molded by the thermoplastic resin A. In FIG. 4(B) and FIG. 4(C), to facilitate understanding, the tape-like FRP base material 21 is shown as being in a flat plate state as shown in FIG. 4(A). As shown in FIGS. 4(B) and 4(C), in the molded portion 22 formed by the thermoplastic resin composition A integrated with the FRP base material 21, in addition to a portion 23 molded into a shape along the FRP base material 21, ribs 24 as additional molded portions are formed.

Figure 4D:
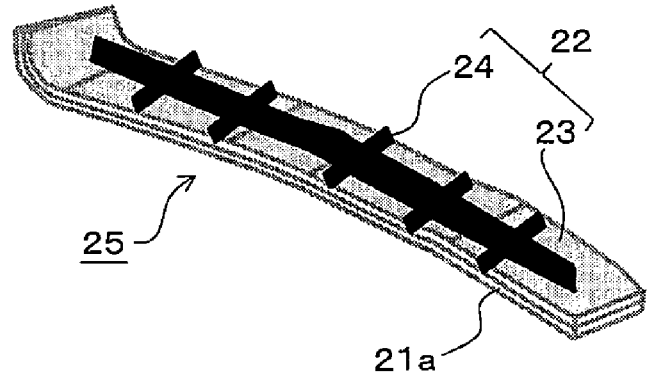

Actually, as shown in FIG. 4(D), a composite molded body 25 having a three-dimensional shape portion is molded in which the FRP base material 21 formed into a three-dimensional shape and the molded portion 23 made of the thermoplastic resin A having a shape along the three-dimensional shape are integrated, and the ribs 24 are molded on the molded portion 23 integrally.

In the molding as described above, it is possible to perform forming of the tape-like FRP base material 21 into the three-dimensional shape and injection molding of the thermoplastic resin composition A in the same mold, and it becomes possible to perform the forming and integration easily and efficiently in a short period of time compared to an ordinary three-dimensional forming using a press machine or the like. Further, when the ribs 24 as the additional molded portions as shown in FIGS. 4(B)-4(D) are not provided, warping or peeling may occur originating from the difference in coefficient of linear expansion between the thermoplastic resin composition A and the FRP base material 21, whereas, by providing the ribs 24, the composite molded body 25 having the targeted shape can be obtained reliably and accurately. Furthermore, when the composite molded body 25 is used as a primary molded article and a thermoplastic resin composition B is further injected to manufacture a secondary injection molded article, insertion of the composite molded body 25 as the primary molded article as molded as described above into a predetermined position of a mold for secondary molding is facilitated, and the accuracy is improved. Also, when performing the secondary molding in the system in which a cavity is slid into a newly set second cavity in the same mold provided with a slide mechanism and the thermoplastic resin composition A is injected into the second cavity, similarly an efficient and high-accuracy molding is possible.

Figure 5:
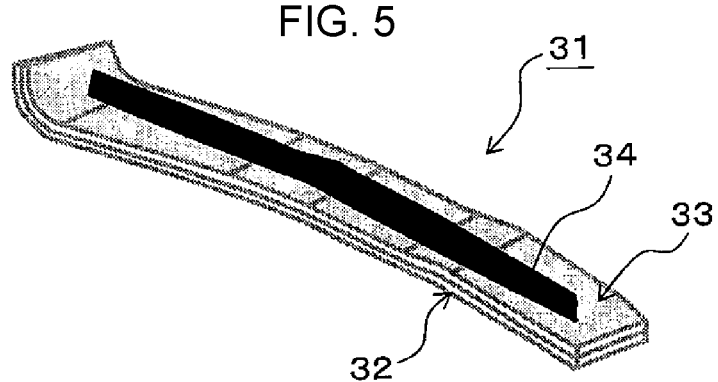
FIG. 5 is a schematic perspective view of a composite molded body having a three-dimensional shape portion manufactured by a method of manufacturing a composite molded body according to a third example.

The rib 24 as the additional molded portion shown in FIGS. 4(B)-4(D) can also take a formation as shown in FIG. 5. In a composite molded body 31 shown in FIG. 5, a molded portion 33 made of the thermoplastic resin A is integrated on a tape-like FRP base material 32 formed into a three-dimensional shape, and on the molded portion 33, a rib 34 as a strip-like additional molded portion is integrally molded in a state of being stood up.

Figure 6:
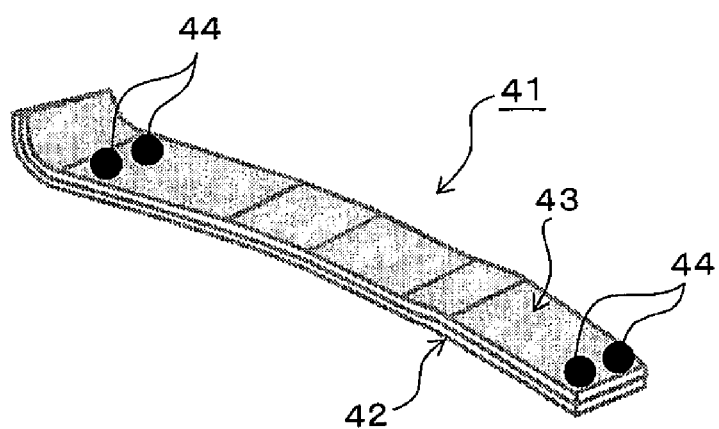
FIG. 6 is a schematic perspective view of a composite molded body having a three-dimensional shape portion manufactured by a method of manufacturing a composite molded body according to a fourth example.

Further, the additional molded portion is not limited to the above-described ribs, and may take a form of a boss portion. For example, in a composite molded body 41 shown in FIG. 6, a molded portion 43 made of a thermoplastic resin A is integrated on a tape-like FRP base material 42 formed into a three-dimensional shape, and on the molded portion 43, bosses 44 as additional molded portions are integrally molded by a number necessary for a required portion.

Figure 7A:
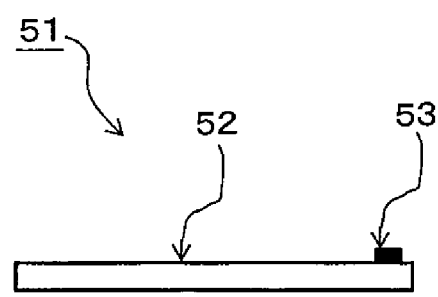
FIGS. 7(A)-7(C) show various examples of additional molded portions of composite molded bodies manufactured by a method of manufacturing a composite molded body.
Figure 7B:
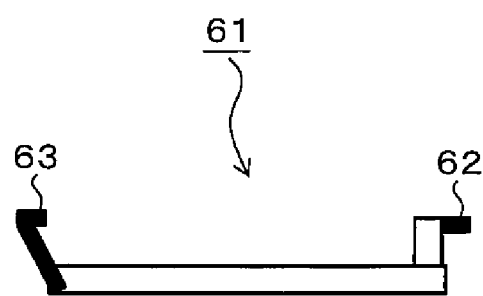
Figure 7C:
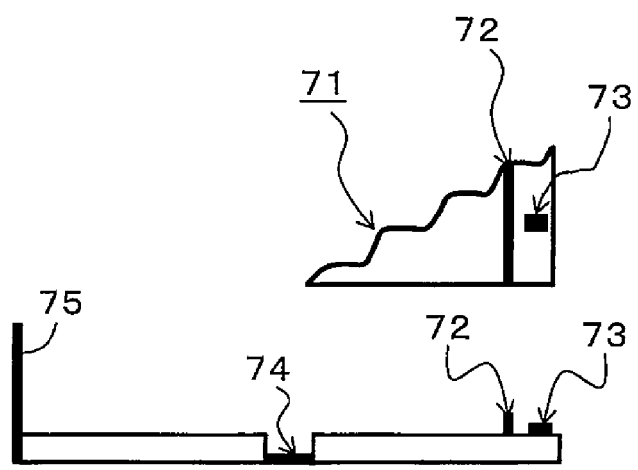

Further, as additional molded portions, for example, various forms as shown in FIGS. 7(A)-7(C) can be employed. In a composite molded body 51 shown in FIG. 7(A), in a portion where a tape-like FRP base material and a molded portion made of a thermoplastic resin A are integrated, particularly in a molded portion 52 of the thermoplastic resin A, a convex portion 53 as an additional molded portion is formed integrally. In a composite molded body 61 shown in FIG. 7(B), a flange 62 and a claw 63 as additional molded portions are integrally formed. In a composite molded body 71 shown in FIG. 7(C), a boss 72, a rib 73, a hinge 74 and a side wall 75 as additional molded portions are formed integrally. Thus, it is possible to appropriately provide the additional molded portions with various forms either solely or in a combined form as needed.

Further, although not shown in the figures, as aforementioned, a composite molded body as a secondary molded article can also be manufactured by inserting a composite molded body formed into a three-dimensional shape as described above into another cavity (a cavity of another mold or a cavity set in the same mold at another shape or another size) as a primary molded article, and injecting a molten thermoplastic resin composition B (which may be the same thermoplastic resin composition as the thermoplastic resin composition A or a thermoplastic resin composition different from the thermoplastic resin composition A) into the cavity. In this case, by providing the additional molded portion shown above in another cavity, it can be installed on the primary molded article with a high accuracy at a desired position. Further, when injecting thermoplastic resin composition A or thermoplastic resin composition B for secondary molding, because the primary molded article does not flow, a secondary molded article integrated with the FRP base material can be obtained at a high accuracy.

INDUSTRIAL APPLICABILITY

The method of manufacturing a composite molded body is applicable to the manufacture of any composite molded body which forms a tape-like FRP base material into a three-dimensional shape and integrates with a thermoplastic resin.

The invention claimed is:

1. A method of manufacturing a composite molded body by forming a FRP tape base material into a three-dimensional shape and integrating the FRP base material with a thermoplastic resin composition A in a mold for injection molding, comprising:
    (1) a step of introducing the FRP base material into the mold via a slit part provided in the mold which is a gap engraved in the mold in a state where the mold is closed, and inserting the FRP base material along a mold cavity; and
    (2) a step of injecting a molten thermoplastic resin composition A into the mold cavity to form the FRP base material into a three-dimensional shape and integrate the injected thermoplastic resin composition A and the FRP base material.

2. The method according to claim 1, wherein an additional molded portion, which is partially different in molded shape from a surrounding portion, is formed in a portion molded by the thermoplastic resin composition A.

3. The method according to claim 2, wherein the additional molded portion is at least one of a convex portion, a boss, a rib, a hinge, a flange, a claw and a side wall of the molded body.

4. The method according to claim 1, wherein the FRP base material contains continuous reinforcing fibers.

5. The method according to claim 4, wherein the FRP base material comprises a unidirectional base material in which continuous reinforcing fibers are arranged in one direction.

6. The method according to claim 1, wherein the reinforcing fibers of the FRP base material include carbon fibers.

7. The method according to claim 1, wherein the thermoplastic resin composition A comprises at least one resin selected from a polyamide-based resin, a polyarylene sulfide-based resin and a polyolefin-based resin.

8. The method according to claim 1, wherein a mold cavity having a slide mechanism is used as said mold cavity.

9. The method according to claim 8, wherein, when the cavity having the slide mechanism is referred to as a first cavity, the first cavity is slid to a newly set second cavity together with the composite molded body, the composite molded body is placed in the second cavity, and a molten thermoplastic resin composition A is injected into and filled in the second cavity to be integrated with the composite molded body to manufacture a composite molded body as a secondary molded article.

10. The method according to claim 1, wherein the composite molded body formed into a three-dimensional shape is inserted into a cavity of another mold, and a molten thermoplastic resin composition B is injected into the cavity to manufacture a composite molded body as a secondary molded article.

11. The method according to claim 2, wherein the FRP base material contains continuous reinforcing fibers.

12. The method according to claim 3, wherein the FRP base material contains continuous reinforcing fibers.

* * * * *